United States Patent
Itoh

(10) Patent No.: US 8,922,878 B2
(45) Date of Patent: Dec. 30, 2014

(54) OPTICAL AMPLIFIER AND METHOD

(71) Applicant: Fujitsu Limited, Kawasaki-shi, Kanagawa (JP)

(72) Inventor: Hiroyuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/904,758

(22) Filed: May 29, 2013

(65) Prior Publication Data

US 2014/0029082 A1 Jan. 30, 2014

(30) Foreign Application Priority Data

Jul. 24, 2012 (JP) ................. 2012-163629

(51) Int. Cl.
*H01S 3/131* (2006.01)

(52) U.S. Cl.
USPC ............. 359/337.11; 359/337.12; 359/341.41

(58) Field of Classification Search
USPC .......................... 359/337.11, 337.12, 341.41
See application file for complete search history.

(56) References Cited

U.S. PATENT DOCUMENTS

| | | | | |
|---|---|---|---|---|
| 5,764,404 A | * | 6/1998 | Yamane et al. | 359/337.12 |
| 6,144,487 A | * | 11/2000 | Michishita | 359/337.1 |
| 6,459,527 B1 | * | 10/2002 | Kosaka | 359/337.1 |
| 7,057,802 B2 | * | 6/2006 | Kajiya et al. | 359/337.1 |
| 7,688,498 B2 | * | 3/2010 | Onaka et al. | 359/337 |
| 7,969,647 B2 | * | 6/2011 | Bolshtyansky et al. | 359/334 |
| 2011/0292497 A1 | * | 12/2011 | Bolshtyansky et al. | 359/334 |

FOREIGN PATENT DOCUMENTS

| | | |
|---|---|---|
| JP | 10-209967 | 8/1998 |
| JP | 11-186962 | 7/1999 |
| JP | 2002-368698 | 12/2002 |
| JP | 2004-6887 | 1/2004 |

* cited by examiner

*Primary Examiner* — Mark Hellner
(74) *Attorney, Agent, or Firm* — Staas & Halsey LLP

(57) ABSTRACT

An optical amplifier includes: a rare-earth doped fiber configured to amplify signal light to thereby produce a amplified signal light; a gain control circuit configured to control an optical gain of the rare-earth doped fiber; a photodetector configured to detect intensities of different wavelength of light obtained from the amplified signal light; and an abnormality detection circuit configured to detect an abnormality of the signal light in accordance with a ratio or a difference between the intensities of the different wavelength.

18 Claims, 10 Drawing Sheets

OPTICAL AMPLIFIER AND METHOD

CROSS-REFERENCE TO RELATED APPLICATION

This application is based upon and claims the benefit of priority of the prior Japanese Patent Application No. 2012-163629 filed on Jul. 24, 2012, the entire contents of which are incorporated herein by reference.

FIELD

The embodiments discussed herein are related to the detection of the abnormality of an optical signal that occurs in an optical amplifier.

BACKGROUND

In an optical amplifier including a rare-earth doped fiber and an excitation light source, a ratio between light levels detected in a light input monitoring unit and an output monitoring unit that include optical branching couplers and photodiodes, namely, an optical gain, is maintained at a given level owing to automatic gain control.

An amplifier alarm circuit detects an increase in spontaneous emission light output from the optical amplifier. A signal component in a predetermined wavelength band passes through a band pass filter to remove the wavelength component of an optical signal and the power of the signal component is compared with a threshold value. When power exceeding the threshold value has been detected, it is determined that spontaneous emission light has increased, and an output abnormality alarm is output.

In an optical transmission system, a case where the optical power of light having been received is smaller than a predetermined threshold value is determined as an abnormality. Each of a signal light wavelength component and a predetermined noise light component is extracted from transmitted light, the ratio of optical powers of the signal light wavelength component and the predetermined noise light component is compared with a predetermined value, and the deterioration of transmission quality is detected.

A related technique is disclosed in Japanese Laid-open Patent Publication No. 2002-368698, Japanese Laid-open Patent Publication No. 2004-6887, Japanese Laid-open Patent Publication No. 10-209967, or Japanese Laid-open Patent Publication No. 11-186962.

SUMMARY

According to an aspect of the embodiments, an optical amplifier includes: a rare-earth doped fiber configured to amplify signal light to thereby produce a amplified signal light; a gain control circuit configured to control an optical gain of the rare-earth doped fiber; a photodetector configured to detect intensities of different wavelength of light obtained from the amplified signal light; and an abnormality detection circuit configured to detect an abnormality of the signal light in accordance with a ratio or a difference between the intensities of the different wavelength.

The object and advantages of the invention will be realized and attained by means of the elements and combinations particularly pointed out in the claims.

It is to be understood that both the foregoing general description and the following detailed description are examples and are explanatory in nature and are not restrictive of the invention, as claimed.

DESCRIPTION OF EMBODIMENTS

When a failure caused by increase in optical-loss has occurred in an optical component in an optical amplifier, a light output may be decreased or the ratio of the power of a spontaneous emission light (amplified spontaneous emission: ASE) component to the power of a signal component may be increased. The ratio of the power of the ASE component to the power of the signal component may be increased based on an increase in a transmission path loss between optical amplifiers. Therefore, based on a power ratio between the signal component and the ASE component, another factor other than the optical amplifier may be detected as the abnormality of the optical amplifier.

Figure 1:
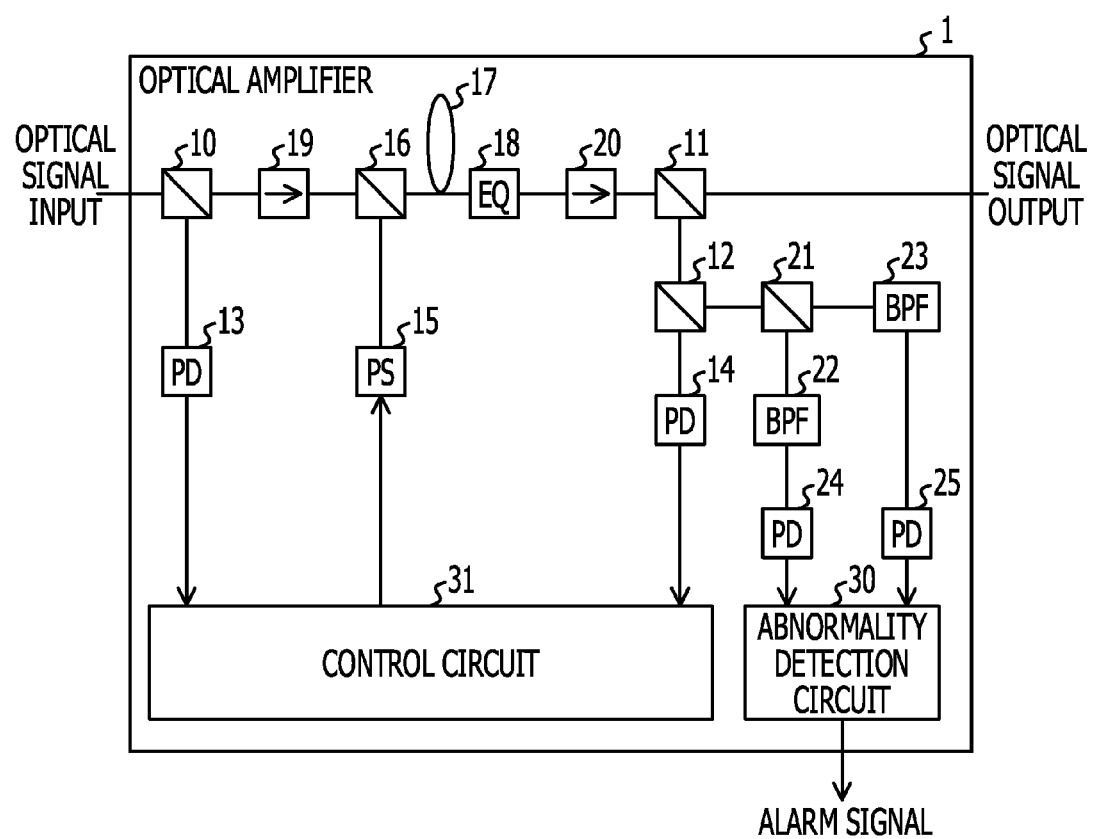
FIG. 1 illustrates an example of a hardware configuration of an optical amplifier.

FIG. 1 illustrates an example of the hardware configuration of an optical amplifier. An optical amplifier 1 includes optical branching couplers 10, 11, 12, and 21, photodiodes (PD) 13, 14, 24, and 25, an excitation light source (PS) 15, an optical coupler 16, and a rare-earth doped fiber 17. The optical amplifier 1 includes an equalizer (EQ) 18, optical isolators 19 and 20, and band pass filters (BPF) 22 and 23. The optical amplifier 1 includes an abnormality detection circuit 30 and a control circuit 31.

The abnormality detection circuit 30 and the control circuit 31 may include a logic circuit such as an application specific integrated circuit (ASIC) or a field-programming gate array (FPGA). The abnormality detection circuit 30 and the control circuit 31 may also include amplifier circuits and analog-digital converter circuits, used for reading the detection signals of the photodiodes 13, 14, 24, and 25, and a digital-analog converter circuit and a drive circuit, used for driving the excitation light source 15.

In the drawing, the photodiode, the excitation light source, the equalizer, and the band pass filter may be expressed as "PD", "PS", "EQ", and "BPF", respectively. The hardware configuration illustrated in FIG. 1 is just exemplified, and the configuration thereof may be arbitrary.

The photodiode 13 detects and supplies, to the control circuit 31, the optical power of the input optical signal of the optical amplifier 1, which has branched from the optical branching coupler 10. The photodiode 14 detects and supplies, to the control circuit 31, the optical power of the output optical signal of the optical amplifier 1, which has branched from the optical branching coupler 11 and passed through the optical coupler 12. The control circuit 31 feedback-controls the excitation light source 15 so that a ratio in optical power between the input optical signal and the output optical signal, for example, an optical gain, becomes a given level. The optical coupler 16 multiplexes and causes signal light, input from the optical branching coupler 10 through the optical isolator 19, and excitation light from the excitation light source 15, to enter the rare-earth doped fiber 17.

The equalizer 18 equalizes the wavelength characteristic of the signal light amplified by the rare-earth doped fiber 17. To the equalizer 18, a transmission characteristic is assigned whose characteristic is opposite to the gain-wavelength characteristic of the rare-earth doped fiber 17 according to a population inversion rate corresponding to a preliminarily defined optical gain. The output of the equalizer 18 passes through the optical isolator 20 and the optical branching coupler 11 and is output from the optical amplifier 1.

The output optical signal of the optical amplifier 1 having branched from the optical branching coupler 11 is caused to further branch by the optical branching coupler 12 and enters the optical branching coupler 21. The optical branching coupler 21 causes the incident light to further branch and enter the band pass filters 22 and 23. The band pass filters 22 and 23 individually extract and input the wavelength components of different wavelengths $\lambda1$ and $\lambda2$ to the photodiodes 24 and 25.

The photodiodes 24 and 25 detect the optical powers of these incident lights, for example, the wavelength components of the wavelengths $\lambda1$ and $\lambda2$ in the output optical signal of the optical amplifier 1, and supplies the optical powers to the abnormality detection circuit 30. Based on the optical powers of these wavelength components, the abnormality detection circuit 30 detects the abnormality of an optical signal, which has occurred based on the failure caused by increase in optical-loss of an optical component in the optical amplifier 1.

Figure 2A:
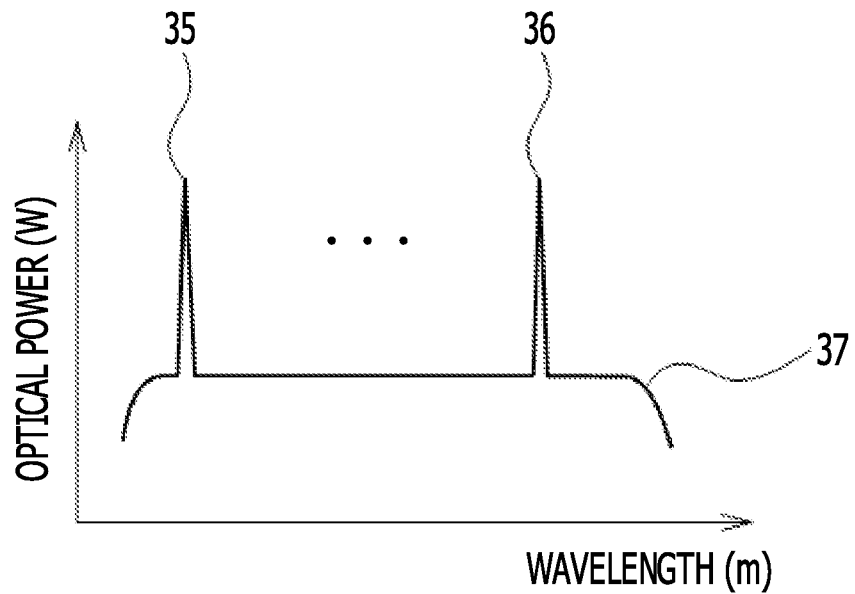
FIG. 2A and FIG. 2B illustrate examples of an output spectrum.
Figure 2B:
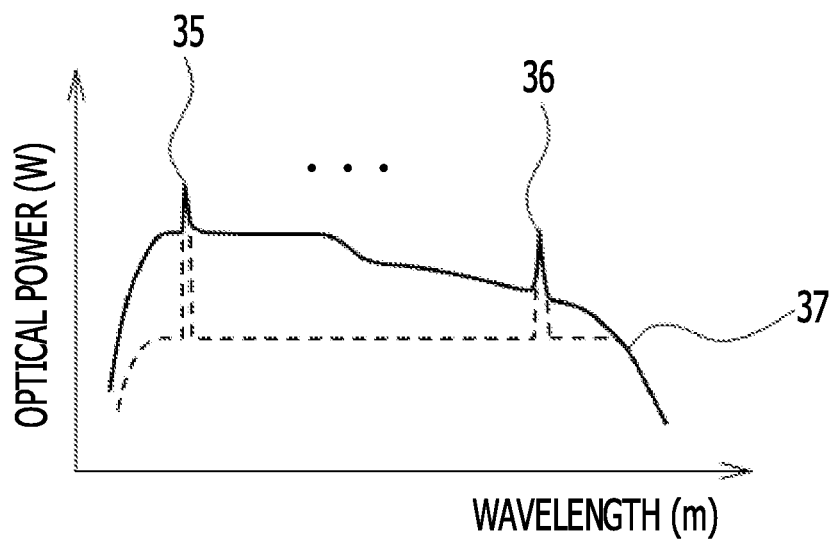

FIG. 2A and FIG. 2B illustrate examples of an output spectrum. FIG. 2A illustrates the output spectrum of the optical amplifier 1. The output spectrum of the optical amplifier 1 includes a plurality of signal components 35, . . . , and 36 and an ASE component 37. When the failure caused by increase in optical-loss of an optical component within the optical amplifier 1 has occurred, the signal components 35, . . . , and 36 become reduced. For example, when a faulty optical component is an optical component between the optical branching coupler 11 and the rare-earth doped fiber 17, the control circuit 31 increases the gain of the rare-earth doped fiber 17 so as to maintain output light power. Therefore, the ASE component is increased. This state is illustrated in FIG. 2B.

Figure 3:
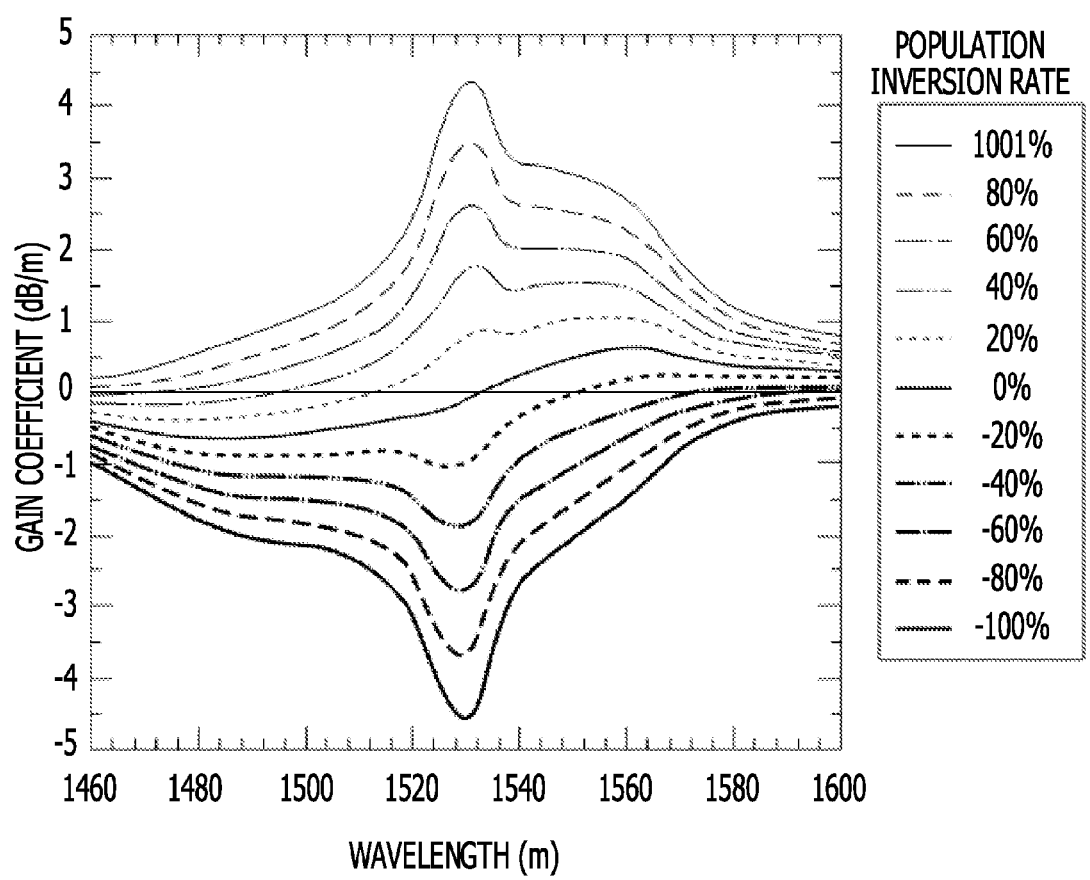
FIG. 3 illustrates an example of a gain-wavelength characteristic.

As illustrated in FIG. 2B, the ASE component having been increased based on the failure caused by increase in optical-loss of the optical component has a characteristic of decreasing with an increase in a wavelength. FIG. 3 illustrates an example of a gain-wavelength characteristic. In FIG. 3, the gain-wavelength characteristics of a rare-earth doped fiber are illustrated in various population inversion rates. In the wavelength bands of a C band (1530 to 1565 nm) and an L band (1565 nm to 1625 nm) used in optical communication, a gain decreases with an increase in a wavelength, and that tendency increases in a state where the population inversion rate is larger.

When, at the time of the failure caused by increase in optical-loss of the optical component, the gain of the rare-earth doped fiber has increased, for example, the population inversion rate has increased, equalization due to the equalizer 18 becomes insufficient. Therefore, a gain-wavelength characteristic occurs where a gain decreases with an increase in a wavelength, and the power of the ASE component decreases with an increase in a wavelength.

Figure 4A:
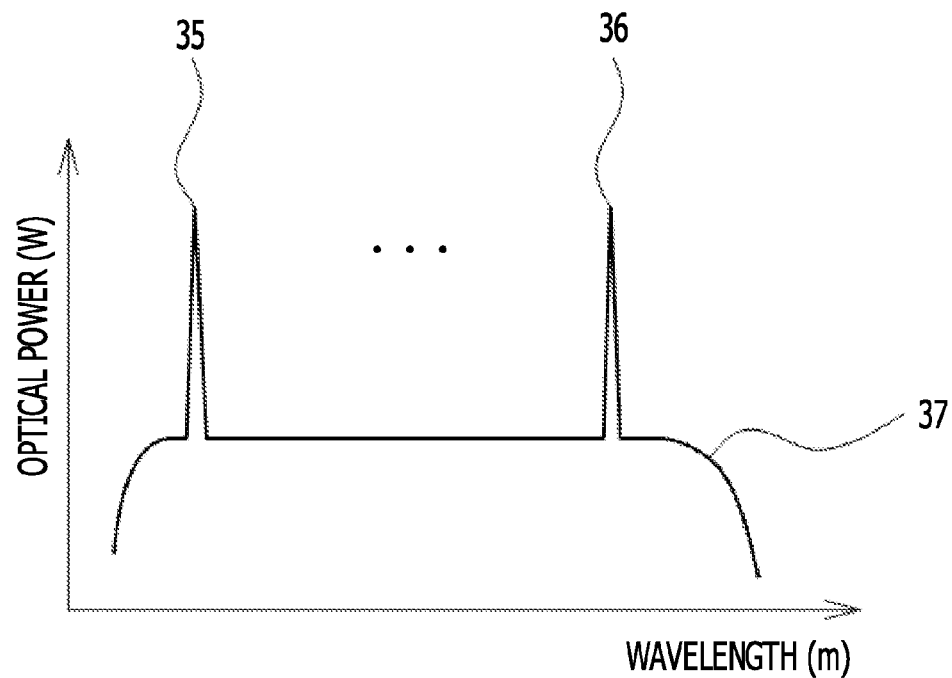
FIG. 4A and FIG. 4B illustrate examples of a spectrum of wavelength-multiplexed signal light.
Figure 4B:
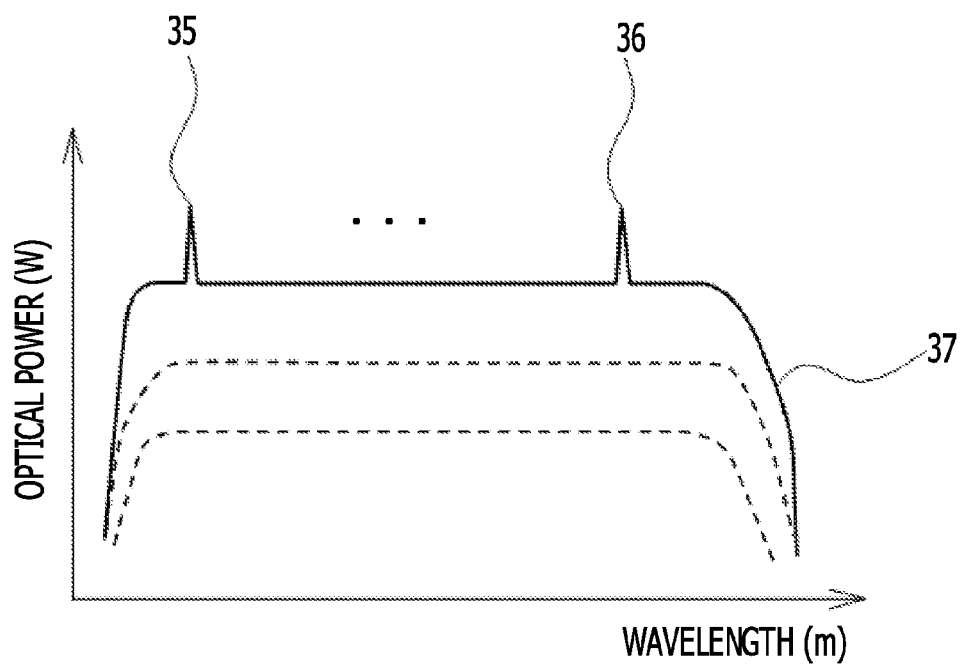

FIG. 4A and FIG. 4B illustrate examples of the spectrum of wavelength-multiplexed signal light. In FIG. 4A and FIG. 4B, the spectra of wavelength-multiplexed signal light are individually illustrated that are subjected to a small transmission path loss and a large transmission path loss. As illustrated in FIG. 4A and FIG. 4B, the ratio of a signal to ASE decreases with an increase in the transmission path loss. A characteristic may not occur where the ASE component decreases in a long wavelength region such as when the population inversion rate of the rare-earth doped fiber has increased.

Figure 5A:
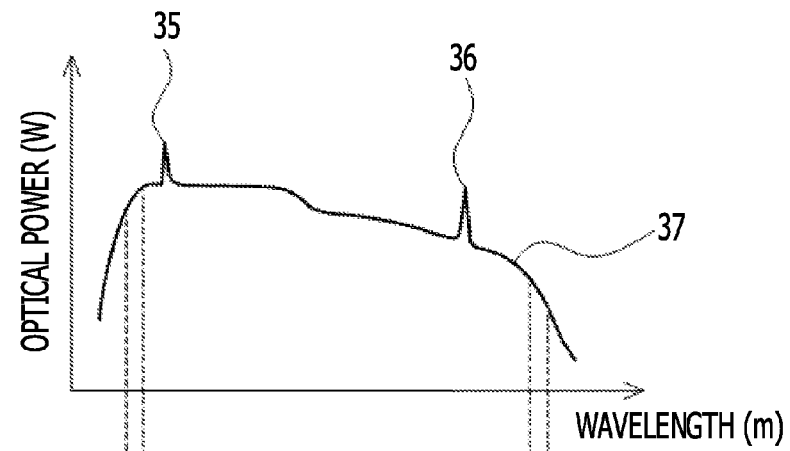
FIG. 5A, FIG. 5B, and FIG. 5C illustrate examples of a spectrum of equalized light.
Figure 5B:
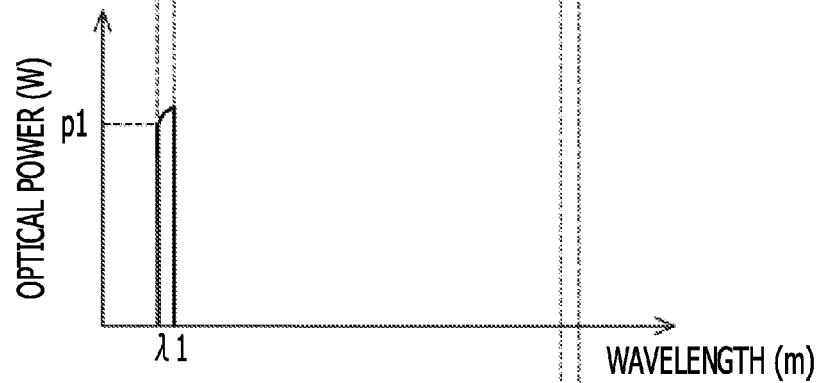
Figure 5C:
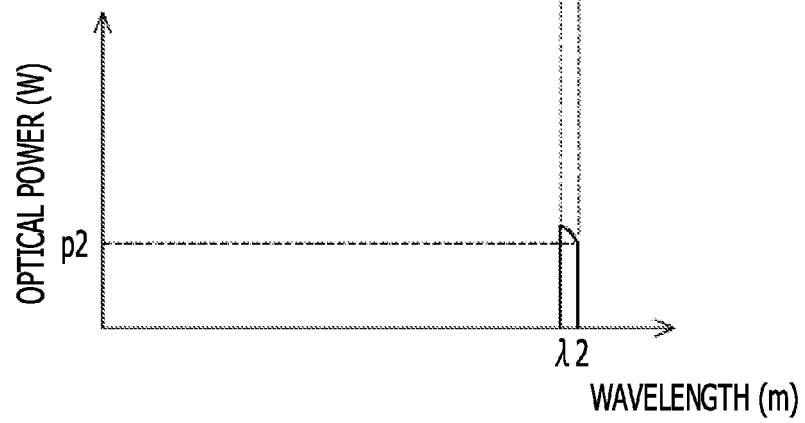

Based on a ratio in optical power between the wavelength components of the different wavelengths $\lambda1$ and $\lambda2$ in the light amplified by the rare-earth doped fiber 17, the abnormality detection circuit 30 detects the abnormality of an optical signal. FIG. 5A, FIG. 5B, and FIG. 5C illustrate examples of the spectrum of equalized light. FIG. 5A illustrates the pattern diagram of the spectrum of light amplified by the rare-earth doped fiber 17 and equalized by the equalizer 18. The light equalized by the equalizer 18 is led into the band pass filters 22 and 23 by the optical branching couplers 11, 12, and 21, and only the wavelength components of the wavelengths $\lambda1$ and $\lambda2$ are individually extracted.

FIG. 5B and FIG. 5C individually illustrate the pattern diagrams of the spectra of the wavelength components of the wavelengths $\lambda1$ and $\lambda2$ extracted by the band pass filters 22 and 23. The optical power p1 and the optical power p2 of the wavelength components of the wavelengths $\lambda1$ and $\lambda2$ are detected by the photodiodes 24 and 25, and input to the abnormality detection circuit 30.

Based on the optical power p1 and the optical power p2, the abnormality detection circuit 30 determines whether or not the ASE component decreases with an increase in a wavelength. When the ASE component decreases with an increase in a wavelength, the abnormality detection circuit 30 detects the failure caused by increase in optical-loss of an optical component. For example, when an optical power ratio $r=p1/p2$ is larger than a predetermined threshold value, the abnormality detection circuit 30 detects the failure caused by increase in optical-loss of an optical component.

Figure 6A:
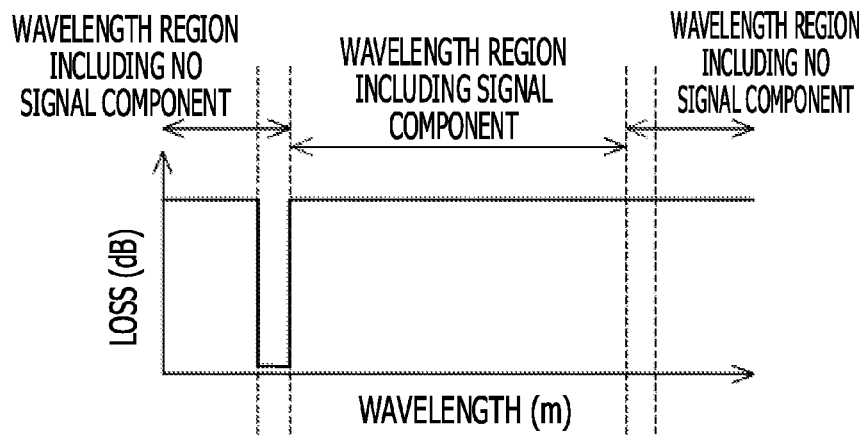
FIG. 6A and FIG. 6B illustrate examples of pass bands of band pass filters.
Figure 6B:
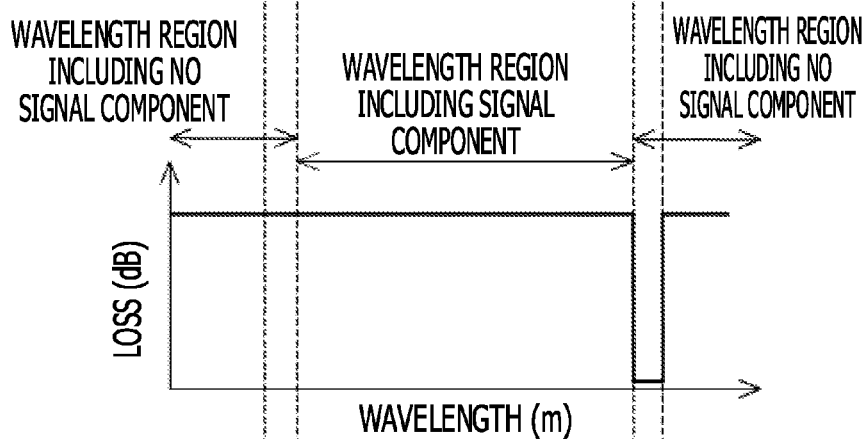

FIG. 6A and FIG. 6B illustrate examples of the pass bands of the band pass filters 22 and 23. So as to extract the wavelength components of the wavelengths $\lambda1$ and $\lambda2$, the band pass filters 22 and 23 individually cause only the wavelength regions of the wavelengths $\lambda1$ and $\lambda2$ to pass therethrough. The $\lambda1$ and $\lambda2$ may also be set in wavelength regions including no signal component. For example, in FIGS. 6A and 6B, the wavelength $\lambda1$ may be a wavelength shorter than a wavelength region including a signal component, and the wavelength $\lambda2$ may be a wavelength longer than the wavelength region including the signal component.

Figure 6C:
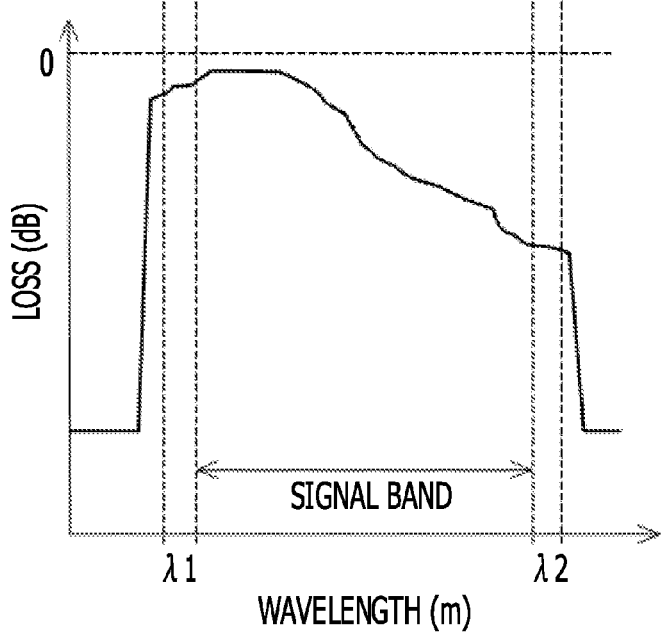
FIG. 6C illustrates an example of an equalization characteristic.

FIG. 6C illustrates an example of an equalization characteristic. In FIG. 6C, the equalization characteristic of the equalizer 18 is illustrated. An equalization region due to the equalizer 18 covers the wavelengths $\lambda1$ and $\lambda2$. Therefore, a difference between the optical power p1 and the optical power p2 becomes large in a state where the failure caused by increase in optical-loss of an optical component does not occur, and the failure caused by increase in optical-loss of an optical component may not be erroneously detected.

Figure 7:
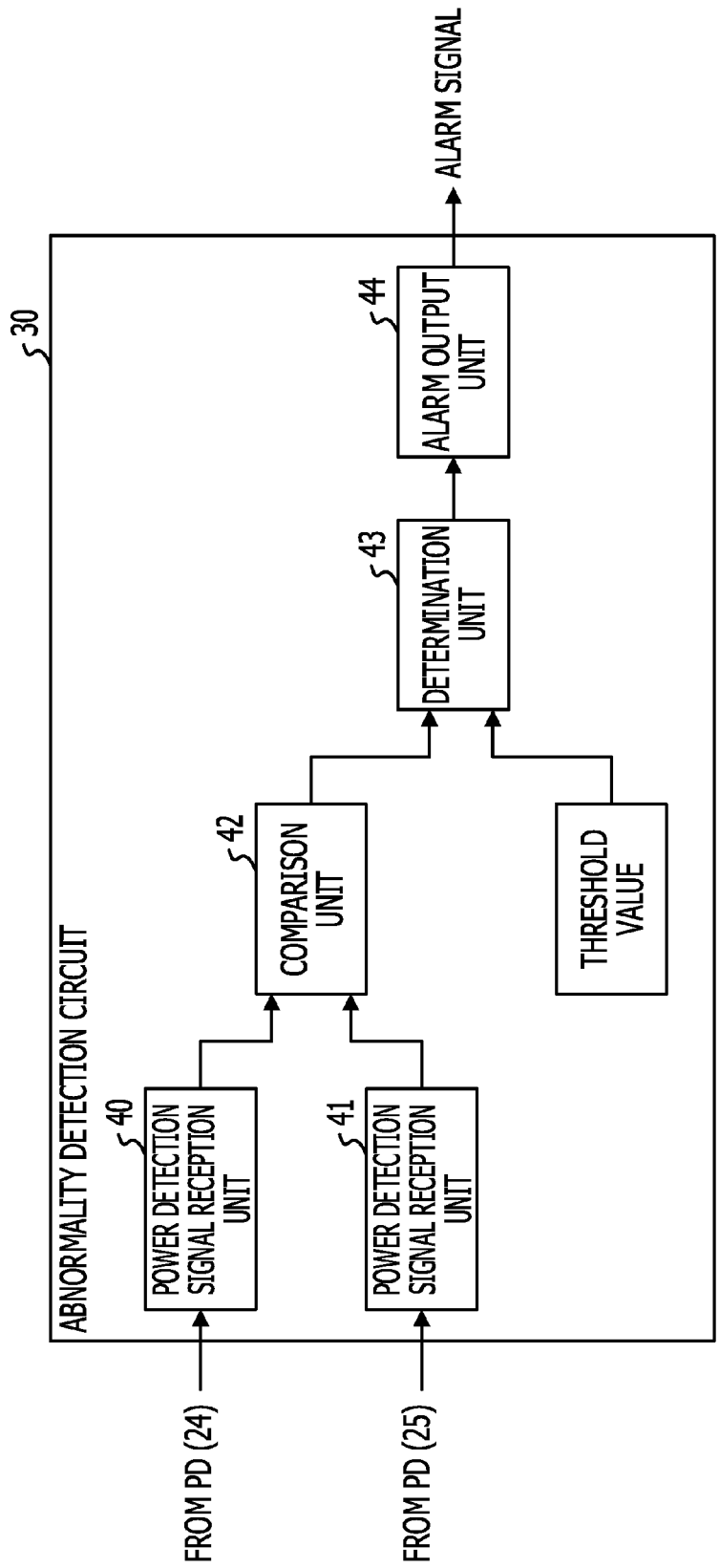
FIG. 7 illustrates an example of an abnormality detection circuit.

FIG. 7 illustrates an example of an abnormality detection circuit. The abnormality detection circuit 30 includes power detection signal reception units 40 and 41, a comparison unit 42, a determination unit 43, and an alarm output unit 44. The power detection signal reception units 40 and 41 receive, from the photodiodes 24 and 25, power detection signals indicating the values p1 and p2 of the optical power of the wavelengths λ1 and λ2.

The comparison unit 42 compares the values p1 and p2 of the optical power of the wavelengths λ1 and λ2 with each other, and calculates a ratio r=p1/p2 of the optical power p1 to the optical power p2. When the optical power ratio r exceeds a threshold value Th, the determination unit 43 determines that the ASE component decreases with an increase in a wavelength and an abnormality has occurred in an optical signal based on the occurrence of the failure caused by increase in optical-loss of an optical component. When the optical power ratio r does not exceed the threshold value Th, the determination unit 43 may not determine that an abnormality has occurred in an optical signal.

When the abnormality of an optical signal has been detected, the alarm output unit 44 outputs a predetermined alarm signal indicating that the failure caused by increase in optical-loss of an optical component has occurred and an abnormality has occurred in an optical signal. The alarm signal may be a visual signal visually giving notice of the occurrence of an abnormality. For example, the alarm signal may be the flashing of a lamp or an LED or the displaying of a message or an icon due to an image display device or a character display device. The alarm signal may also be an audible signal such as a message or a buzzer, which audibly gives notice of the occurrence of an abnormality. The alarm signal may also be an electromagnetic signal used for interrupting the operation of the optical amplifier 1 or notifying another device of the occurrence of an abnormality.

Figure 8:
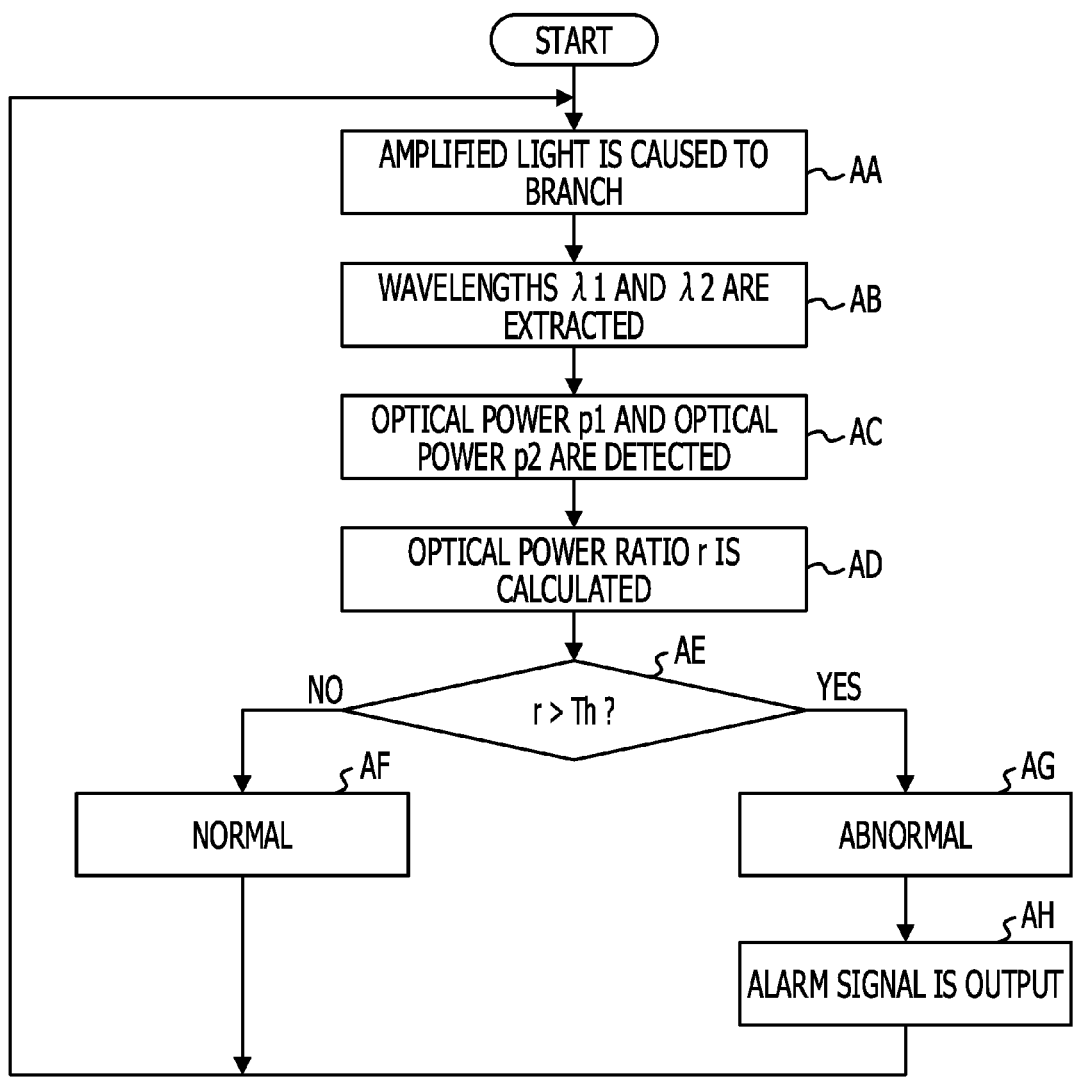
FIG. 8 illustrates an example of an operation of an optical amplifier.

FIG. 8 illustrates an example of the operation of an optical amplifier. A series of operations illustrated in FIG. 8 may also include a plurality of procedures.

In an operation AA, the optical branching couplers 11, 12, and 21 cause the light amplified by the rare-earth doped fiber 17 to branch and be led into the band pass filters 22 and 23. In an operation AB, the band pass filters 22 and 23 individually extract only the wavelength components of the wavelengths λ1 and λ2 from within the incident light. In an operation AC, the photodiodes 24 and 25 detect the optical power p1 and the optical power p2 of the wavelength components of the wavelengths λ1 and λ2.

In an operation AD, the comparison unit 42 calculates the ratio r=p1/p2 of the optical power p1 to the optical power p2. In an operation AE, the determination unit 43 determines whether or not the optical power ratio r exceeds the threshold value Th. When the optical power ratio r exceeds the threshold value Th (the operation AE: Y), the processing proceeds to an operation AG. When the optical power ratio r does not exceed the threshold value Th (the operation AE: N), the processing proceeds to an operation AF.

In an operation AF, the determination unit 43 determines that an optical component is normal. The processing returns to the operation AA. In the operation AG, the determination unit 43 determines that the failure caused by increase in optical-loss of an optical component has occurred and an optical signal is abnormal. The processing proceeds to an operation AH. In the operation AH, the alarm output unit 44 outputs the predetermined alarm signal. The processing returns to the operation AA.

It is determined whether the abnormality of an optical signal detected based on an increase in the ASE component is caused by the failure of an optical component within the optical amplifier or caused by another factor. Therefore, the false detection of an optical signal abnormality occurring in the optical amplifier may be reduced, and it may be easy to specify a failure point.

Figure 9A:
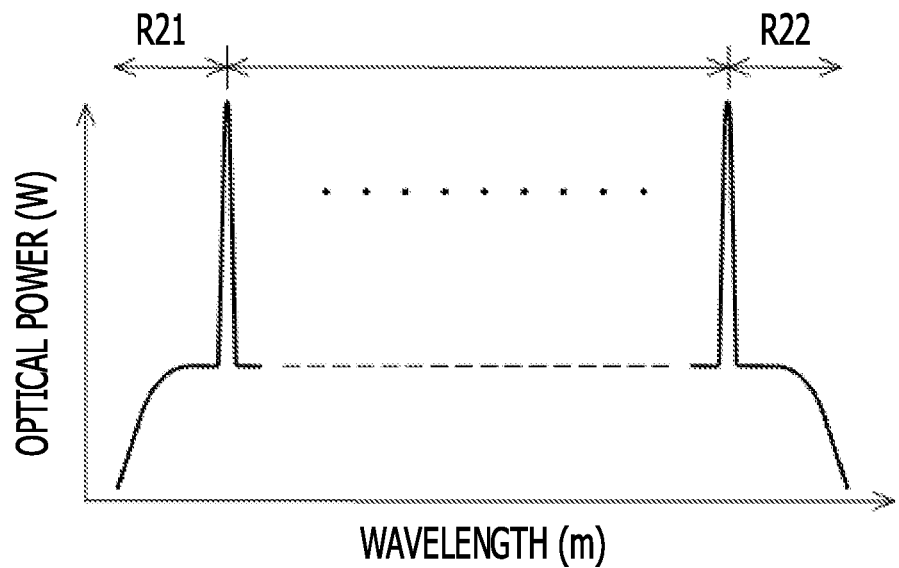
FIG. 9A and FIG. 9B illustrate examples of a wavelength region.
Figure 9B:
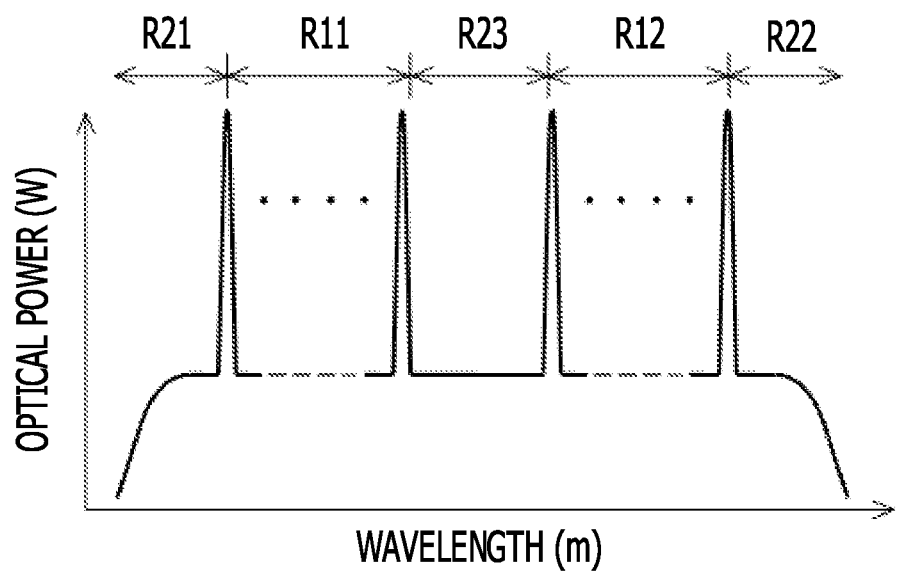

The wavelengths λ1 and λ2 whose optical power values are compared in the comparison unit 42 may be wavelengths within a wavelength region including no signal component. FIG. 9A and FIG. 9B illustrate examples of a wavelength region. In FIG. 9A, wavelength regions including no signal component are illustrated. The wavelengths λ1 and λ2 may be selected from a region R21 whose wavelength is shorter than the wavelength of a wavelength region R1 including a signal and a region R22 whose wavelength is longer than the wavelength of the wavelength region R1 including the signal.

In FIG. 9B, wavelength regions including no signal component are illustrated. A wavelength region R23 including no signal component may be provided in, for example, a region sandwiched between wavelength regions R11 and R12 including a signal. For example, the wavelengths λ1 and λ2 may be wavelengths located between the wavelength regions R11 and R12 including the signal. A wavelength region including the signal may be temporally switched, and the values p1 and p2 of the optical power may be detected during a time period when no signal is included in the wavelengths λ1 and λ2.

For example, in the wavelength bands of an O band (1260 to 1360 nm) and an S band (1460 nm to 1530 nm), at the time of the failure caused by increase in optical-loss of an optical component, the power of the ASE component increases with an increase in a wavelength. Therefore, in an optical amplifier used in these wavelength bands, when the ASE component increases with an increase in a wavelength, the abnormality detection circuit 30 may determine that an abnormality has occurred in an optical signal based on the occurrence of the failure caused by increase in optical-loss of an optical component. For example, when the ratio r=p2/p1 of the optical power p2 to the optical power p1 has exceeded a threshold value, the abnormality detection circuit 30 may determine that an abnormality has occurred in an optical signal based on the occurrence of the failure caused by increase in optical-loss of an optical component. In any case of a case where the power of the ASE component decreases with an increase in a wavelength and a case where the power of the ASE component increases with an increase in a wavelength, the abnormality detection circuit 30 may also detect the occurrence of the failure caused by increase in optical-loss of an optical component. For example, in accordance with the wavelength-intensity characteristic of the ASE component included in light amplified by the rare-earth doped fiber 17 and equalized by the equalizer 18, the abnormality detection circuit 30 may also detect the occurrence of the failure caused by increase in optical-loss of an optical component. For example, when a ratio between the optical power p1 and the optical power p2 has exceeded a predetermined acceptable range, it may be determined that an abnormality has occurred in an optical signal based on the occurrence of the failure caused by increase in optical-loss of an optical component.

When, in place of the ratio between the optical power p1 and the optical power p2, a difference between the optical power p1 and the optical power p2 has exceeded a threshold value, it may be determined that an abnormality has occurred in an optical signal based on the occurrence of the failure caused by increase in optical-loss of an optical component. The band pass filters 22 and 23 individually detecting the wavelength components of λ1 and λ2 may be separated filters and may also be integrated filters.

Figure 10:
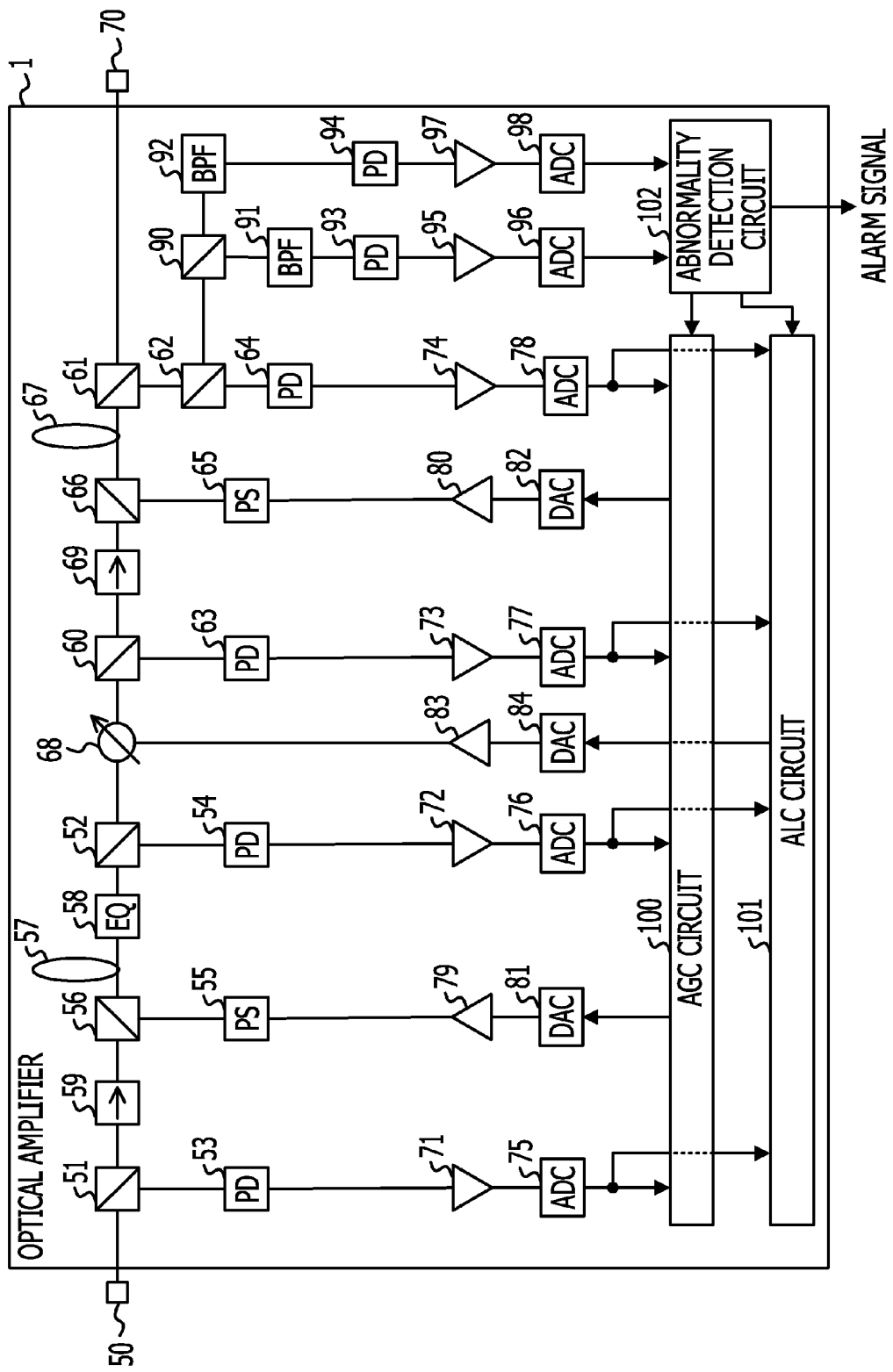
FIG. 10 illustrates an example of a hardware configuration of an optical amplifier.

FIG. 10 illustrates an example of the hardware configuration of an optical amplifier. An optical amplifier 1 includes an input port 50, optical branching couplers 51, 52, 60, 61, 62, and 90, and photodiodes 53, 54, 63, 64, 93, and 94. The optical amplifier 1 includes excitation light sources 55 and 65, optical couplers 56 and 66, rare-earth doped fibers 57 and 67, and an output port 70. The optical amplifier 1 includes an equalizer 58, optical isolators 59 and 69, a variable optical attenuator 68, and band pass filters 91 and 92. The optical amplifier 1 includes amplifier circuits 71, 72, 73, 74, 95, and 97 and analog-digital converter circuits 75, 76, 77, 78, 96, and 98. The optical amplifier 1 includes drive circuits 79, 80, and 83 and digital-analog converter circuits 81, 83, and 84.

The optical amplifier 1 includes an automatic gain control circuit 100, an automatic level control circuit 101, and an abnormality detection circuit 102. The automatic gain control circuit 100, the automatic level control circuit 101, and the abnormality detection circuit 102 include logic circuits such as ASICs or FPGAs. In the drawing, an analog-digital converter circuit, a digital-analog converter circuit, automatic gain control, and automatic level control may be expressed as "ADC", "DAC", "AGC", and "ALC", respectively. A variable optical attenuator may be expressed as "VOA".

A preceding-stage optical amplification unit may include the optical branching couplers 51 and 52, the photodiodes 53 and 54, the excitation light source 55, the optical coupler 56, the rare-earth doped fiber 57, the optical isolator 59, and the automatic gain control circuit 100. The preceding-stage optical amplification unit may also include the amplifier circuits 71 and 72, the analog-digital converters 75 and 76, the drive circuit 79, and the digital-analog converter 81.

The photodiodes 53 and 54 detect and supply, to the automatic gain control circuit 100, the optical power of the input light and the optical power of the output light of the preceding-stage optical amplification unit, which have branched from the optical branching couplers 51 and 52. The automatic gain control circuit 100 feedback-controls the excitation light source 55 so that a ratio in optical power between the input light and the output light of the preceding-stage optical amplification unit becomes a given level. The optical coupler 56 multiplexes and causes signal light, input from the optical branching coupler 51 through the optical isolator 59, and excitation light from the excitation light source 55, to enter the rare-earth doped fiber 57.

The amplifier circuits 71 and 72 amplify the detection signals of the photodiodes 53 and 54, and the analog-digital converters 75 and 76 convert the amplified detection signals into digital signals, and supply the digital signals to the automatic gain control circuit 100. The digital-analog converter 81 converts the control signal of the excitation light source 55, output by the automatic gain control circuit 100, into a driving signal having an analog form. The drive circuit 79 amplifies and supplies the driving signal to the excitation light source 55.

A subsequent-stage optical amplification unit may include the optical branching couplers 60, 61, and 62, the photodiodes 63 and 64, the excitation light source 65, the optical coupler 66, the rare-earth doped fiber 67, the optical isolator 69, and the automatic gain control circuit 100. The subsequent-stage optical amplification unit may also include the amplifier circuits 73 and 74, the analog-digital converters 77 and 78, the drive circuit 80, and the digital-analog converter 82.

The photodiode 63 detects and inputs, to the automatic gain control circuit 100, the optical power of the subsequent-stage optical amplification unit, which has branched from the optical branching coupler 60. The photodiode 64 detects and inputs, to the automatic gain control circuit 100, the optical power of the output light of the subsequent-stage optical amplification unit, which has branched from the optical branching coupler 61 and passed through the optical branching coupler 62. The automatic gain control circuit 100 feedback-controls the excitation light source 65 so that a ratio in optical power between the input light and the output light of the subsequent-stage optical amplification unit becomes a given level. The optical coupler 66 multiplexes and causes signal light, input from the optical branching coupler 60 through the optical isolator 69, and excitation light from the excitation light source 65, to enter the rare-earth doped fiber 67.

The amplifier circuits 73 and 74 amplify the detection signals of the photodiodes 63 and 64, and the analog-digital converters 77 and 78 convert the amplified detection signals into digital signals, and supply the digital signals to the automatic gain control circuit 100. The digital-analog converter 82 converts the control signal of the excitation light source 65, output by the automatic gain control circuit 100, into a driving signal having an analog form. The drive circuit 80 amplifies and supplies the driving signal to the excitation light source 65.

The equalizer 58 equalizes the wavelength characteristic of the signal light amplified by the rare-earth doped fibers 57 and 67. To the equalizer 58, transmission characteristics are assigned whose characteristics are opposite to the gain-wavelength characteristics of the rare-earth doped fibers 57 and 67 according to population inversion rates corresponding to preliminarily defined optical gains.

In the optical amplifier 1, the VOA 68 is disposed between the preceding-stage amplification unit and the subsequent-stage amplification unit (an interstage VOA configuration). Based on the power of the output light of the optical amplifier 1, detected by the photodiode 64, the automatic level control circuit 101 increases or decreases the attenuation of the optical signal, and hence, maintains the output light of the optical amplifier 1 at a given level. The digital-analog converter 84 converts the control signal of the VOA 68, output by the automatic level control circuit 101, into a driving signal having an analog form. The drive circuit 83 amplifies and supplies the driving signal to the VOA 68.

The output optical signal of the optical amplifier 1 having branched from the optical branching coupler 61 is caused to further branch by the optical branching coupler 62 and enters the optical branching coupler 90. The optical branching coupler 90 causes the incident light to further branch and enter the band pass filters 91 and 92. The band pass filters 91 and 92 individually extract and input the wavelength components of the different wavelengths $\lambda 1$ and $\lambda 2$ to the photodiodes 93 and 94.

The photodiodes 93 and 94 detect the optical powers of these incident lights, for example, the wavelength components of the wavelengths $\lambda 1$ and $\lambda 2$ in the output optical signal of the optical amplifier 1, and supplies the optical powers to the abnormality detection circuit 102. The amplifier circuits 95 and 97 amplify the detection signals of the photodiodes 93 and 94. The analog-digital converters 96 and 98 convert the amplified detection signals into digital signals, and supply the digital signals to the abnormality detection circuit 102.

Based on the optical powers of these wavelength components, the abnormality detection circuit 102 detects the abnormality of an optical signal, which has occurred based on the failure caused by increase in optical-loss of an optical component in the optical amplifier 1. The processing of the abnormality detection circuit 102 may be substantially the same as or similar to the processing of the abnormality detection circuit 30 illustrated in FIG. 7 and FIG. 8.

When the input light has been reduced based on the abnormal loss of a transmission path fiber transmitting light to enter the optical amplifier 1, the optical amplifier 1 having the interstage VOA configuration may maintain the level of the output light at a given level by changing the attenuation of the VOA 68. Therefore, the level of the output light may be maintained at a given level without changing the signal gains of the rare-earth doped fibers 57 and 67 in the preceding-stage amplification unit and the subsequent-stage amplification unit.

When the abnormal loss of the transmission path has occurred and the attenuation of the VOA 68 has been reduced, the ASE component of the output light of the optical amplifier 1 increases and the ratio of a signal to ASE decreases, as illustrated in FIG. 4B. Since the signal gains of the rare-earth doped fibers 57 and 67 do not change from gains in a state where an abnormality does not occur, a characteristic of becoming smaller in a long wavelength region may not occur in the ASE component. Therefore, the abnormality detection circuit 102 may not determine that the loss-increase failure of an optical component has occurred.

When the failure caused by increase in optical-loss of an optical component has occurred, the characteristic of becoming smaller in a long wavelength region occurs in the ASE component of the output light of the optical amplifier 1. Therefore, the abnormality detection circuit 102 may determine that the failure caused by increase in optical-loss of an optical component has occurred, and may determine that an abnormality has occurred in the optical signal.

When the abnormality of an optical signal has occurred in an optical amplifier having an interstage VOA configuration, it may be determined whether the abnormality of the optical signal is caused by the failure of an optical component within the optical amplifier or caused by another factor. Therefore, the false detection of an optical signal abnormality occurring in the optical amplifier may be reduced, and it may be easy to specify a failure point.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifier comprising:
   a rare-earth doped fiber configured to amplify signal light to thereby produce a amplified signal light;
   a gain control circuit configured to control an optical gain of the rare-earth doped fiber;
   a photodetector configured to detect intensities of different wavelengths of light obtained from the amplified signal light; and
   an abnormality detection circuit configured to calculate a ratio or a difference between the intensities of the different wavelengths and detect an abnormality of the signal light in accordance with the ratio or the difference between the intensities of the different wavelengths.

2. The optical amplifier according to claim 1, wherein the different wavelengths are in a wavelength region including no signal component.

3. The optical amplifier according to claim 1, wherein the different wavelengths are in a wavelength region where a time period including a signal component and a time period including no signal component are temporally switched.

4. The optical amplifier according to claim 1, further comprising:
   an equalizer configured to equalize a gain-wavelength characteristic of the rare-earth doped fiber in an amplification inversion rate,
   wherein the photodetector detects the intensities equalized by the equalizer.

5. The optical amplifier according to claim 1, wherein the photodetector includes a first photodetector and a second photodetector, the first photodetector detects a first intensity of the light and the second photodetector detects a second intensity of the light.

6. The optical amplifier according to claim 5, further comprising:
   a variable attenuator configured to attenuate the signal light; and
   a control circuit configured to control an attenuation of the variable attenuator in accordance with the first intensity.

7. The optical amplifier according to any one of claim 1, wherein the photodetector includes a filter configured to extract the different wavelengths from the light obtained by amplifying the signal light in the rare-earth doped fiber, and detects the intensities of the different wavelengths which have passed through the filter.

8. The optical amplifier according to claim 1, further comprising:
   a plurality of filters configured to individually extract the different wavelength: and
   a demultiplexer configured to cause the light obtained by amplifying the signal light in the rare-earth doped fiber to branch into light to enter the plural filters.

9. The optical amplifier according to claim 1, wherein the abnormality detection circuit outputs a signal indicating an error signal when the ratio or the difference between the intensities of the different wavelengths exceeds an acceptable range.

10. The optical amplifier according to claim 9, wherein the error signal indicates an occurrence of a failure of an optical component in the optical amplifier.

11. The optical amplifier according to claim 1, wherein the abnormality detection circuit includes a first comparator configured to calculate the ratio or the difference between the intensities of the different wavelengths and a second comparator configured to compare the ratio with a threshold value.

12. An optical amplifier comprising:
   a rare-earth doped fiber configured to amplify signal light;
   a gain control circuit configured to control an optical gain of the rare-earth doped fiber;
   first photodetector configured to detect a first intensity of a light obtained by amplifying the signal light in the rare-earth doped fiber;
   a second photodetector configured to detect a second intensity of the light obtained by amplifying the signal light in the rare-earth doped fiber;
   a first comparator configured to calculate a ratio or a difference between the first intensity and the second intensity; and
   an abnormality detection circuit configured to detect an abnormality based on the ratio.

13. The optical amplifier according to claim 12, further comprising:
   a second comparator configured to compare the ratio with a threshold value.

14. The optical amplifier according to claim 12, further comprising,
   an optical branching coupler configured to branch the light to the first photodetector and the second photodetector.

15. A method comprising:
   amplifying the signal light using a rare-earth doped fiber;
   controlling an optical gain of the rare-earth doped fiber;

detecting intensities of different wavelengths of light branched from the amplified signal light;

calculating a ratio or a difference between the detected intensities; and detecting an abnormality of the signal light in accordance with the ratio or the difference between the detected intensities.

16. The method according to claim 15, further comprising:

detecting a first intensity of a first wavelength of the light;

detecting a second intensity of a second wavelength of the light; and detecting the abnormality based on the first intensity and the second intensity.

17. The method according to claim 15, further comprising:

extracting the first wavelength from the light using a first filter; and extracting the second wavelength from the light using a second filter.

18. The method according to claim 15, further comprising:

calculating the ratio or the difference between the intensities of the different wavelengths exceeds an acceptable range;

comparing the ratio with a threshold value; and outputting an error signal when the ratio or the difference exceeds the threshold value.

* * * * *

UNITED STATES PATENT AND TRADEMARK OFFICE
CERTIFICATE OF CORRECTION

| | |
|---|---|
| PATENT NO. | : 8,922,878 B2 |
| APPLICATION NO. | : 13/904758 |
| DATED | : December 30, 2014 |
| INVENTOR(S) | : Hiroyuki Itoh |

It is certified that error appears in the above-identified patent and that said Letters Patent is hereby corrected as shown below:

In the Claims

Column 10, Line 14, in Claim 7, delete "to any one of" and insert -- to --, therefor.
Column 10, Line 23, in Claim 8, delete "wavelength:" and insert -- wavelength; --, therefor.
Column 10, Line 45, in Claim 12, delete "first" and insert -- a first --, therefor.

Signed and Sealed this
Fifth Day of May, 2015

Michelle K. Lee
*Director of the United States Patent and Trademark Office*